US012467741B2

United States Patent
Itoh et al.

(10) Patent No.: US 12,467,741 B2
(45) Date of Patent: Nov. 11, 2025

(54) MEASUREMENT METHOD AND MEASUREMENT APPARATUS FOR MEASURING THICKNESS OF SEMICONDUCTOR WAFER

(71) Applicant: santec Holdings Corporation, Aichi (JP)

(72) Inventors: Hiroyuki Itoh, Aichi (JP); Atsushi Morosawa, Aichi (JP); Keiji Isamoto, Aichi (JP)

(73) Assignee: santec Holdings Corporation, Aichi (JP)

( * ) Notice: Subject to any disclaimer, the term of this patent is extended or adjusted under 35 U.S.C. 154(b) by 150 days.

(21) Appl. No.: 18/190,567

(22) Filed: Mar. 27, 2023

(65) Prior Publication Data

US 2023/0349688 A1 Nov. 2, 2023

(30) Foreign Application Priority Data

Mar. 31, 2022 (JP) .................................. 2022-059800

(51) Int. Cl.
  *G01B 11/06* (2006.01)
  *G01B 9/02* (2022.01)
  *G01B 9/02015* (2022.01)

(52) U.S. Cl.
  CPC .......... *G01B 11/06* (2013.01); *G01B 9/02016* (2013.01); *G01B 9/02084* (2013.01); *G01B 2210/56* (2013.01)

(58) Field of Classification Search
  CPC ................. G01B 11/06; G01B 11/0675; G01B 2210/42; G01B 2210/48; G01B 2210/56;
  (Continued)

(56) References Cited

U.S. PATENT DOCUMENTS 5,129,724 A * 7/1992 Brophy .............. G01B 11/0675
  356/511
5,396,332 A * 3/1995 Ciszek ................... G01B 11/06
  250/559.27
(Continued)

FOREIGN PATENT DOCUMENTS

JP  H07306018 A  11/1995
JP  2003042722 A  2/2003
(Continued)

OTHER PUBLICATIONS

Office Action issued on Jun. 25, 2024 in the corresponding Japanese Patent Application No. 2022-059800.
(Continued)

*Primary Examiner* — Hina F Ayub
(74) *Attorney, Agent, or Firm* — Meunier Carlin & Curfman LLC

(57) ABSTRACT

A measurement apparatus for measuring a thickness of a semiconductor wafer includes: an optical system configured to perpendicularly irradiate a sample wafer and a reference wafer with light, and receive interference signals of the light reflected on front and back surfaces of the respective wafers; a signal processor configured to perform frequency analysis of the interference signals received by the optical system to obtain peak positions of a point spread function of the respective wafers; and a calculator configured to calculate a thickness "tsample" of the sample wafer based on the peak position "x" of the sample wafer and the peak position "y" of the reference wafer obtained by the signal processor, and a thickness "treference" of the reference wafer.

13 Claims, 16 Drawing Sheets

(58) Field of Classification Search
CPC ............... G01B 5/0004; G01B 5/0014; G01B 9/02004; G01B 9/02016; G01B 9/02067; G01B 9/02069; G01B 9/0207; G01B 9/02075; G01B 9/02084; G01B 9/0209
See application file for complete search history.

(56) References Cited

U.S. PATENT DOCUMENTS

| | | | |
|---|---|---|---|
| 5,619,329 A | 4/1997 | Otani | |
| 8,949,057 B1* | 2/2015 | Seong | G01B 9/02007 702/99 |
| 2005/0073692 A1* | 4/2005 | De Groot | G01B 9/0209 356/497 |
| 2006/0077394 A1* | 4/2006 | Suzuki | G01J 5/0003 356/479 |
| 2011/0292375 A1* | 12/2011 | Marx | G01B 11/0633 702/172 |
| 2012/0033229 A1* | 2/2012 | Goto | G01B 9/0209 356/601 |
| 2018/0364028 A1* | 12/2018 | Piel | G01B 9/02044 |
| 2022/0196390 A1 | 6/2022 | Miyagawa et al. | |

FOREIGN PATENT DOCUMENTS

| | | | |
|---|---|---|---|
| JP | 2021004795 A | | 1/2021 |
| JP | 2022-16245 A | | 1/2022 |
| JP | 2022016245 A | * | 1/2022 |
| TW | 202100947 A | | 1/2021 |

OTHER PUBLICATIONS

Office Action issued on Feb. 21, 2024 issued for Taiwanese Patent Application No. 112111808.

* cited by examiner

MEASUREMENT METHOD AND MEASUREMENT APPARATUS FOR MEASURING THICKNESS OF SEMICONDUCTOR WAFER

CROSS-REFERENCE TO RELATED APPLICATIONS

This application claims the benefit of Japanese Patent Application No. 2022-059800 filed on Mar. 31, 2022 with the Japan Patent Office, the entire disclosure of which is incorporated herein by reference.

BACKGROUND

The present disclosure relates to measurement method and measurement apparatus for measuring thickness of a semiconductor wafer.

A measurement apparatus described in Japanese Unexamined Patent Application Publication No. 2022-16245 (hereinafter, Patent Document 1) is configured to perpendicularly irradiate a semiconductor wafer with light, and perform frequency analysis of interference signals of the light reflected on a front surface and a bottom surface of the semiconductor wafer to measure thickness of the semiconductor wafer.

Since measurement accuracy decreases when there is a change in intensity of irradiation light on the semiconductor wafer, Patent Document 1 describes also irradiating a reference wafer having a uniform thickness with the light emitted on the semiconductor wafer to acquire interference signals, so that a failure of a light source is determined from fluctuation of the interference signals.

SUMMARY

In the apparatus disclosed in Patent Document 1, when the failure of the light source used for measuring the thickness of the semiconductor wafer is detected, an alarm is raised to stop the measurement. Here, the measurement accuracy changes not only by the light from the light source but also by ambient temperature.

In other words, optical properties of a measurement apparatus and a semiconductor wafer are temperature dependent. Thus, when there is a change in ambient temperature, measured values can fluctuate even if the thickness of the semiconductor wafer is the same.

In one aspect of the present disclosure, it is desirable to provide measurement method and measurement apparatus that allow measurement of the thickness of the semiconductor wafer without being affected by change in ambient temperature.

In a measurement method of a first aspect of the present disclosure, firstly, each of a sample wafer, which is a semiconductor wafer to be measured, and a reference wafer, which is a semiconductor wafer having a uniform thickness, is perpendicularly irradiated with light.

Next, interference signals of the light reflected on front and back surfaces of the sample wafer and the reference wafer are received. Frequency analysis is performed to the received interference signals to obtain peak positions of a point spread function of the sample wafer and the reference wafer. In the following description, the point spread function is referred to as PSF.

Lastly, a thickness "tsample" of the sample wafer is calculated based on the peak position "x" of the sample wafer, and the thickness "treference" and the peak position "y" of the reference wafer.

As above, in the present disclosure, the thickness is not measured by irradiating the sample wafer with light, but by irradiating the sample wafer and the reference wafer simultaneously with light.

Then, from the interference signals obtained from the reflected light from the respective wafers, the peak position corresponding to the thickness of the wafer is obtained. Further, from the peak positions of the respective wafers and the thickness of the reference wafer, the thickness of the sample wafer is calculated.

The reason for calculating the thickness as such is as follows. When there is a change in ambient temperature and the temperature of the sample wafer changes, the temperature of the reference wafer also changes. Thus, the thickness of the sample wafer changes proportionally to the thickness of the reference wafer.

According to the measurement method of the present disclosure, large changes in measurement result of the thickness due to change in ambient temperature, in other words, temperature of the sample wafer, can be reduced. Measurement accuracy of the thickness can be increased.

Next, a measurement apparatus of a second aspect of the present disclosure comprises an optical system for measurement, a signal processor, and a calculator.

The optical system is configured to perpendicularly irradiate each of a sample wafer and a reference wafer with light, and receive interference signals of the light reflected on front and back surfaces of the sample wafer and the reference wafer. The sample wafer is a semiconductor wafer to be measured, and the reference wafer is a semiconductor wafer having a uniform thickness.

The signal processor is configured to perform frequency analysis of the interference signals received by the optical system to obtain peak positions of a PSF of the sample wafer and the reference wafer.

The calculator is configured to calculate a thickness "tsample" of the sample wafer based on a peak position "x" of the sample wafer and a peak position "y" of the reference wafer obtained by the signal processor, and a thickness "treference" of the reference wafer.

According to the measurement apparatus of the present disclosure, the thickness of the sample wafer can be measured in accordance with the above-described measurement method. As above, large changes in measurement result of the thickness due to the change in ambient temperature, in other words, temperature of the sample wafer, can be reduced.

The calculator may be configured to calculate the thickness of the sample wafer, using formula (1) below:

$$tsample = x \cdot treference / y \quad (1)$$

This allows the thickness "tsample" of the sample wafer to be obtained by a simple proportional calculation based on a ratio between the peak position "x" of the sample wafer and the peak position "y" of the reference wafer, and the thickness "treference" of the reference wafer. Accordingly, calculation for the measurement can be simplified. The thickness of each part of the sample wafer can be calculated at high speed.

The calculator may be configured to calculate the thickness of the sample wafer, in consideration of a difference "delay" in time response to temperature change between the sample wafer and the reference wafer, using formula (2) below:

$$tsample(i) = x(i + \text{delay}) \cdot treference / y(i) \qquad (2)$$

where subscript (i) represents a value of specified time.

In other words, the temperatures of the sample wafer and the reference wafer change in accordance with the ambient temperature, but it is difficult to have the same response (specifically, time constant and refractive index temperature coefficient) to the temperature change. Thus, the difference in time response to the temperature change may be set in advance, and the thickness of the sample wafer is calculated using the above-described formula (2) including the difference in time response. Then, the thickness of the sample wafer can be more accurately measured.

The calculator may be configured to calculate the thickness of the sample wafer, using formula (3) below with the above-described difference "delay" in time response, a correction factor "A" for correcting a difference in refractive index temperature coefficient between the sample wafer and the reference wafer, and a correction factor "B" for correcting the difference in time response between the sample wafer and the reference wafer as parameters:

$$tsample(i) = \qquad (3)$$
$$\{x(i + \text{delay}) \cdot treference / y(i)\} - \{y(i) - y(0)\} \cdot A - \{y(i) - y(i+1)\} \cdot B$$

where subscript (i) represents a value of specified time, subscript (0) represents a value of reference time, and subscript (i+1) represents a value of time next to the specified time.

This can more properly correct the difference in refractive index temperature coefficient between the sample wafer and the reference wafer, and the difference in time response between the sample wafer and the reference wafer. The thickness of the sample wafer can be calculated with higher accuracy. The correction factors "A" and "B" may be set in advance by experiment, simulation or the like.

The optical system may be arranged in a free space that provides an irradiation path of the light to the sample wafer, and comprise a beam splitter configured to split the light in two directions within the free space. In this case, the sample wafer can be irradiated with first light, and the reference wafer can be irradiated with second light. The first light and the second light are obtained by splitting the light by the beam splitter. The reference wafer may have the same composition as the sample wafer.

This can bring measurement conditions of the sample wafer closer to measurement conditions of the reference wafer. Calculation accuracy of the thickness using the formulae (1) to (3) can be increased.

The measurement apparatus of the present disclosure may further comprise a temperature adjustment mechanism configured to adjust at least one of temperatures of the sample wafer and the reference wafer. The temperature adjustment mechanism may comprise a blower mechanism configured to blow ambient air to at least one of the sample wafer and the reference wafer. Alternatively, the temperature adjustment mechanism may comprise a temperature control element. The temperature control element may be provided on at least one of the sample wafer and the reference wafer, and configured to directly control the temperature of the sample wafer or the reference wafer.

The temperature adjustment mechanism as above can bring the time responses to the temperature change of the sample wafer and the reference wafer close to each other by hardware configuration. Measurement accuracy of the thickness of the sample wafer can be increased by hardware configuration.

When the blower mechanism is provided as the temperature adjustment mechanism, the blower mechanism may be configured so that air can be blown from both front and back surfaces of the wafer to be blown. Then, the time responses to the temperature change of the wafers can be more quickly brought close to each other.

The measurement space where the sample wafer and the reference wafer are arranged may be enclosed by a housing. This can moderate the change in ambient temperature around the respective wafers, and reduce deterioration of the measurement accuracy due to sharp fluctuation of the ambient temperature.

The measurement apparatus of the present disclosure may comprise a temperature control mechanism configured to control temperature of the measurement space where the sample wafer and the reference wafer are arranged. The temperature control mechanism as above can moderate the change in ambient temperature around the respective wafers, as in the case provided with a housing, and reduce deterioration of the measurement accuracy.

When the measurement apparatus is provided with the temperature control mechanism, the ambient temperature can be intentionally changed to obtain the difference "delay" in time response and the correction factors "A" and "B" in the above-described formula (2) or (3) experimentally.

The optical system may comprise a swept light source configured to continuously and periodically change wavelength of the light as a light source to generate the light emitted on the sample wafer and the reference wafer. The optical system may comprise a photodetector configured to detect the interference signals of the light reflected on the front and back surfaces of the sample wafer and the reference wafer.

In this case, the signal processor may be configured to sample a detection signal from the photodetector multiple times per period, in synchronization with periodical changes in wavelength of the light output from the swept light source, to perform frequency analysis of the detection signal.

The optical system and the signal processor of the measurement apparatus configured as above allows implementation of a SS-OCT (Swept Source-OCT) measurement apparatus disclosed in Patent Document 1.

In this case, the measurement apparatus may further comprise a Mach-Zehnder interferometer configured to take in a portion of the light output from the swept light source to generate a sampling clock signal. In this case, the signal processor may be configured to sample the detection signal from the photodetector based on the sampling clock signal generated by the Mach-Zehnder interferometer.

The measurement apparatus of the present disclosure can receive the interference signals of the reference wafer, and thus can use the interference signals as trigger signals. This makes the Mach-Zehnder interferometer unnecessary, and can simplify the configuration of the SS-OCT measurement apparatus.

The optical system may comprise a broadband light source as a light source to generate the light emitted on the sample wafer and the reference wafer, and a spectrometer configured to separate the interference signals reflected on the front and back surfaces of the sample wafer and the reference wafer per wavelength. In this case, the signal processor may be configured to perform frequency analysis of signals obtained by separation per wavelength by the spectrometer.

The optical system and the signal processor of the measurement apparatus configured as above allows implementation of a SD-OCT (Spectral Domain-OCT) measurement apparatus. In other words, the measurement apparatus of the present disclosure may be a SS-OCT measurement apparatus or a SD-OCT measurement apparatus. In either case, the above-described effect can be obtained.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

Figure 1:
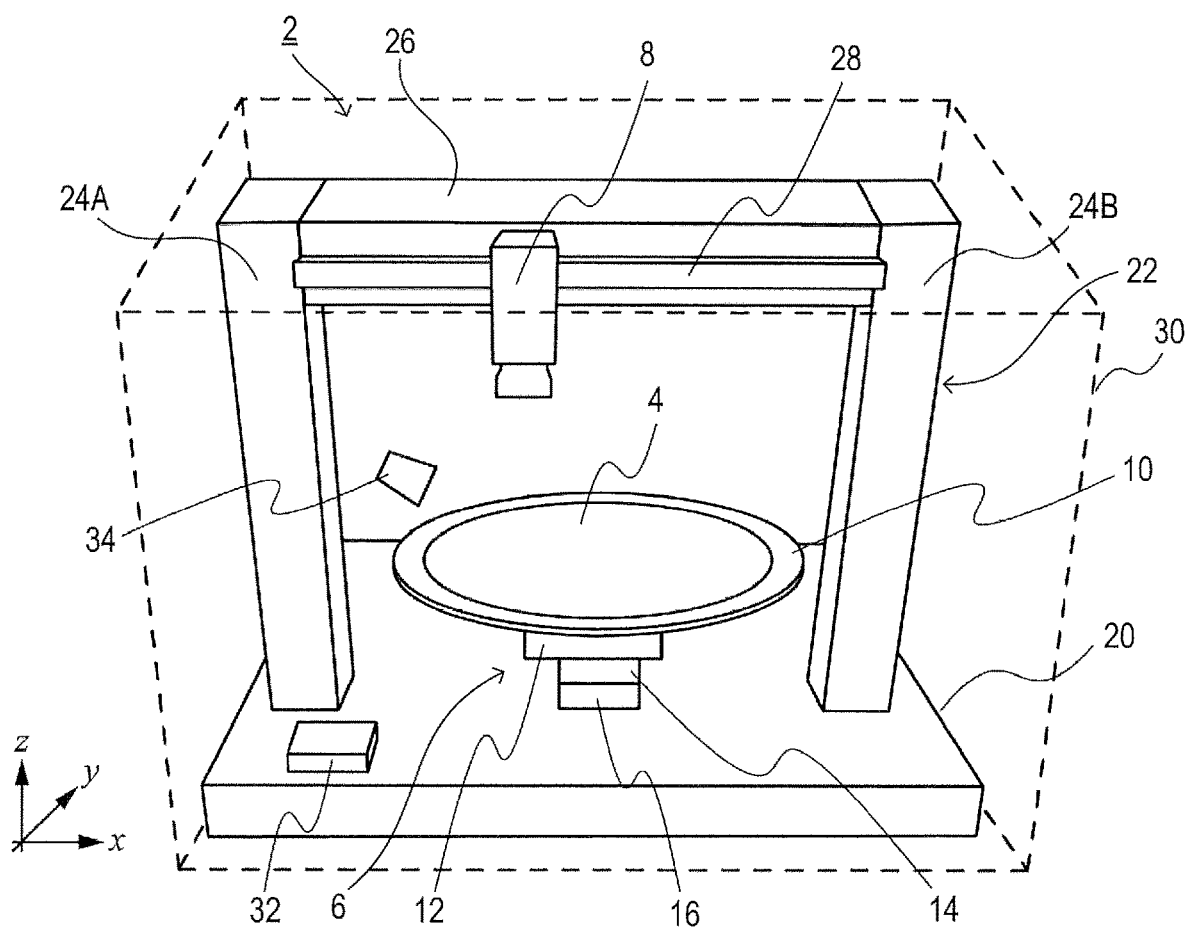
FIG. 1 is an explanatory diagram showing an overall configuration of a thickness distribution measurement apparatus of an embodiment.

A thickness distribution measurement apparatus 2 shown in FIG. 1 is a device for measuring thickness distribution of a sample wafer 4, which is a semiconductor wafer to be measured.

The thickness distribution measurement apparatus 2 comprises an annular holder 10 that holds an outer circumference of the disc-shaped sample wafer 4, and a probe 8 for measurement arranged to oppose a plate surface of the sample wafer 4 held by the holder 10. The probe 8 functions as a measurement apparatus of the present disclosure. The probe 8 is one example of the measurement apparatus of the present disclosure.

The holder 10 is fixed approximately in the middle of a base portion 20 via a supporter 6. The base portion has a horizontal top surface. The supporter 6 comprises an electric rotary 12, a first adjustment stage 14, and a second adjustment stage 16.

The electric rotary 12 rotates the holder 10 about a center axis thereof to rotate the sample wafer 4, so as to change a position for measuring a thickness by the probe 8. The first adjustment stage 14 is arranged below the electric rotary 12, and moves the holder 10 in orthogonal axis directions (x- and y-axis directions shown in FIG. 1) perpendicular to each other on a horizontal plane of the base portion 20. The second adjustment stage 16 is arranged below the first adjustment stage 14, in other words, on top surface of the base portion 20, and moves the holder 10 in an up-down direction (z-axis direction shown in FIG. 1) perpendicular to the horizontal plane of the base portion 20.

The sample wafer 4 held by the holder 10 is arranged so that the plate surface is substantially parallel to the top surface of the base portion 20 via the supporter 6, and can be positioned at a desired position by the first adjustment stage 14 within an arrangement space. A focal length of light emitted from the probe 8 can be adjusted by the second adjustment stage 16. By rotating the electric rotary 12, the position for measuring the thickness of the sample wafer 4 by the probe 8 can be adjusted.

The probe 8 is installed on a support frame 22 fixed to the top surface of the base portion 20. The support frame 22 comprises two supporting shafts 24A, 24B and a connector 26. The two supporting shafts 24A, 24B are erected on a plate surface of the base portion 20 with a space therebetween across the supporter 6. The connector 26 is fixed to upper ends of the two supporting shafts 24A, 24B so as to be parallel to the plate surface of the base portion 20.

The connector 26 of the support frame 22 is provided with a rail 28 to which the probe 8 is fixed. The rail 28 is configured to movably support the probe 8 in a direction of the plate surface of the base portion 20 (for example, x-axis direction shown in FIG. 1). An actuator (not shown) for moving the probe 8 is provided inside the rail 28. With the actuator inside the rail 28, the probe 8 can be horizontally moved above the sample wafer 4 held by the holder 10.

As described above, in the thickness distribution measurement apparatus 2 of the present embodiment, the sample wafer 4 can be rotated about the center axis by the electric rotary 12, and the probe 8 can be horizontally moved by the actuator of the rail 28.

During the measurement of the thickness of the sample wafer 4 by the probe 8, a later-described controller 60 horizontally moves the probe 8 while rotating the sample wafer 4 about the center axis, so as to change a measurement point in a spiral on the plate surface of the sample wafer 4. As a result, measurement of thickness distribution of the entire plate surface of the sample wafer 4 is possible.

The thickness distribution measurement apparatus 2 of the present embodiment is enclosed by the housing 30 in order to stabilize the ambient temperature during the measurement. Inside the housing 30, a temperature control mechanism 32 for controlling internal temperature, in other words, the ambient temperature during the measurement, of the housing 30 as the measurement space is provided. The temperature control mechanism 32 is configured by a so-called air conditioner that can control the ambient temperature to a desired temperature.

This is because, when the temperature of the sample wafer 4 changes, a refractive index of light at the sample wafer 4 changes, and thus a measurement result of the thickness by the probe 8 changes. In the present embodiment, the housing 30 and the temperature control mechanism 32 are used to stabilize the ambient temperature.

Also, the ambient temperature inside the housing 30 is affected by external temperature of the housing 30. Thus, it is not possible to keep the ambient temperature constant with the temperature control mechanism 32 alone. Therefore, a first blower mechanism 34 that blows air onto the front and back surfaces of the sample wafer 4 is provided inside the housing 30 so that the temperature of the sample wafer 4 itself follows the ambient temperature when there is a change in ambient temperature.

The reason for this is because, in the present embodiment, a reference wafer 40 provided on the probe 8 is used for measuring the thickness of the sample wafer 4. In the present embodiment, the first blower mechanism 34 blows air onto the front and back surfaces of the sample wafer 4 to bring temperature change of the sample wafer 4 relative to the ambient temperature close to temperature change of the reference wafer 40, so as to increase measurement accuracy of the thickness. The first blower mechanism 34 corresponds to one example of a temperature adjustment mechanism of the present disclosure, and comprises, for example, two blower fans to blow air onto the front and back surfaces of the sample wafer 4.

Figure 2:
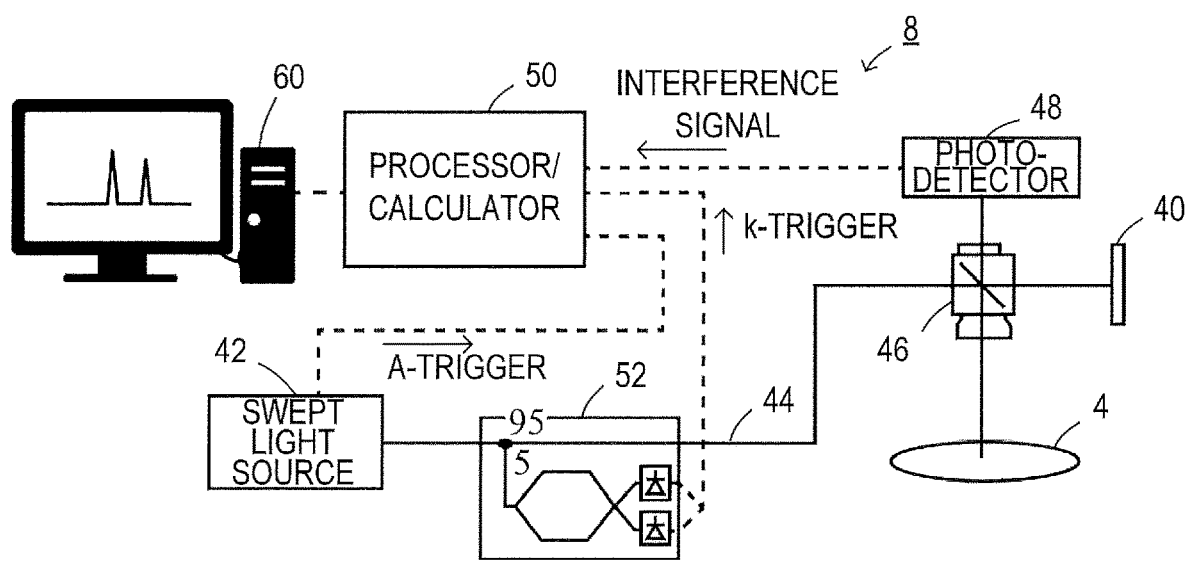
FIG. 2 is an explanatory diagram showing an internal configuration of a probe shown in FIG. 1.

As shown in FIG. 2, the probe 8 as the measurement apparatus is provided with the reference wafer 40. The reference wafer 40 is a semiconductor wafer having the same composition as the sample wafer 4, and is adjusted in advance to have a uniform thickness.

The composition to be the same between the sample wafer 4 and the reference wafer 40 includes the material, dopant type, resistance rate, etc. However, since the reference wafer 40 is provided on the probe 8, the reference wafer 40 is smaller than the sample wafer 4 and has different heat capacity, etc.

In the present embodiment, during the measurement of the thickness of the sample wafer 4, the thickness of the reference wafer 40 is simultaneously measured, and peak positions x, y of a point spread function (PSF) obtained when measuring the respective wafers 4, 40 and the thickness of the reference wafer 40 are used to calculate the thickness of the sample wafer 4.

In order to perform the measurement as above, the probe 8 comprises a swept light source 42, an optical fiber 44, a beam splitter 46, a photodetector 48, a processor/calculator 50, and a Mach-Zehnder interferometer 52.

The swept light source 42 continuously and periodically changes wavelength of light for use in measurement within a specified sweep range and irradiates the optical fiber 44 with the light. The optical fiber 44 guides the light emitted from the swept light source 42 to the beam splitter 46.

The beam splitter 46 is configured to split the light, which is emitted from the optical fiber 44 to the free space via a later-described collimator lens 45, in two orthogonal directions. The plate surface of the sample wafer 4 is perpendicularly irradiated with first light through the free space, and the plate surface of the reference wafer 40 is perpendicularly irradiated with second light through the free space. The first light and the second light are obtained by splitting the light by the beam splitter 46.

The plate surface of the reference wafer 40 is angled so that an optical axis of the light emitted via the beam splitter 46 is perpendicular to an optical axis of the light emitted on the plate surface (horizontal surface) of the sample wafer 4.

When the sample wafer 4 and the reference wafer 40 are irradiated with the light for measurement as such, the front surface and back surface (in other words, bottom surface) of the respective wafers 4, 40 reflect the irradiation light, and interference signals of the reflected light return to the beam splitter 46.

The interference signals from the wafers 4, 40 are incident on the photodetector 48 arranged on the side opposite to the sample wafer 4 from the beam splitter 46, and the photodetector 48 receives the interference signals.

The processor/calculator 50 takes in the interference signals from the wafers 4, 40 converted to electrical signals in the photodetector 48, and measures the thickness of the sample wafer 4 from the interference signals.

Specifically, the processor/calculator 50 first samples the interference signals input from the photodetector 48 based on an A-trigger signal output in synchronization with a sweep cycle (for example, 30 kHz) from the swept light source 42. In addition, the processor/calculator 50 resamples the sampled interference signals based on a k-trigger signal output from the Mach-Zehnder interferometer 44 at equal wavenumber intervals, and correct wavelength variations of the swept light source 42 and nonlinearities in wavelength sweep.

Next, the resampled interference signals are each multiplied by a window function to perform a fast Fourier transformation (hereinafter, FFT), so as to obtain a power spectrum of the PSF. Then, as shown in FIG. 3, the peak positions x, y corresponding to the thicknesses of the sample wafer 4 and the reference wafer 40 are obtained from the power spectrum, and the thickness of the sample wafer 4 are calculated based on the peak positions x, y and the thickness of the reference wafer 40.

Figure 3:
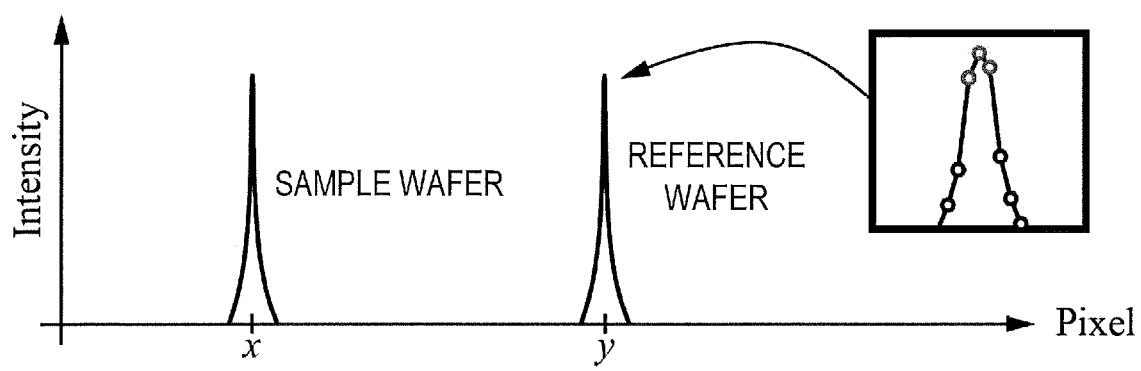
FIG. 3 is an explanatory diagram showing peak positions of a point spread function (PSF) of a sample wafer and a reference wafer.

The peak positions x, y of the sample wafer 4 and the reference wafer 40 are estimated by quadratic function approximation of three points near the maximum value using least squares method, as shown in an enlarged view on the right side of FIG. 3.

The thickness of the sample wafer 4 calculated by the processor/calculator 50, in other words, the measurement result of the thickness is input to the controller 60, and stored as thickness data indicating the thickness distribution of the sample wafer 4, together with position information indicating the measurement point on the sample wafer 4.

The controller 60 is configured by a computer system such as a personal computer. The controller 60, as described above, changes the measurement point by the probe 8 in a spiral on the plate surface of the sample wafer 4 to sequentially perform the measurement, so as to measure the thickness distribution of the sample wafer 4, and store the measurement result in a specific storage medium such as a hard disk.

The Mach-Zehnder interferometer 44 is provided in a light transmission path by the optical fiber 44, and takes in a portion (for example, 5%) of the light emitted from the swept light source 42 to generate a sampling clock signal. Then, from the sampling clock signal, the k-trigger signal for correcting a sweep wavelength band of the swept light source 42 and variations in center wavelength is generated.

Figure 4:
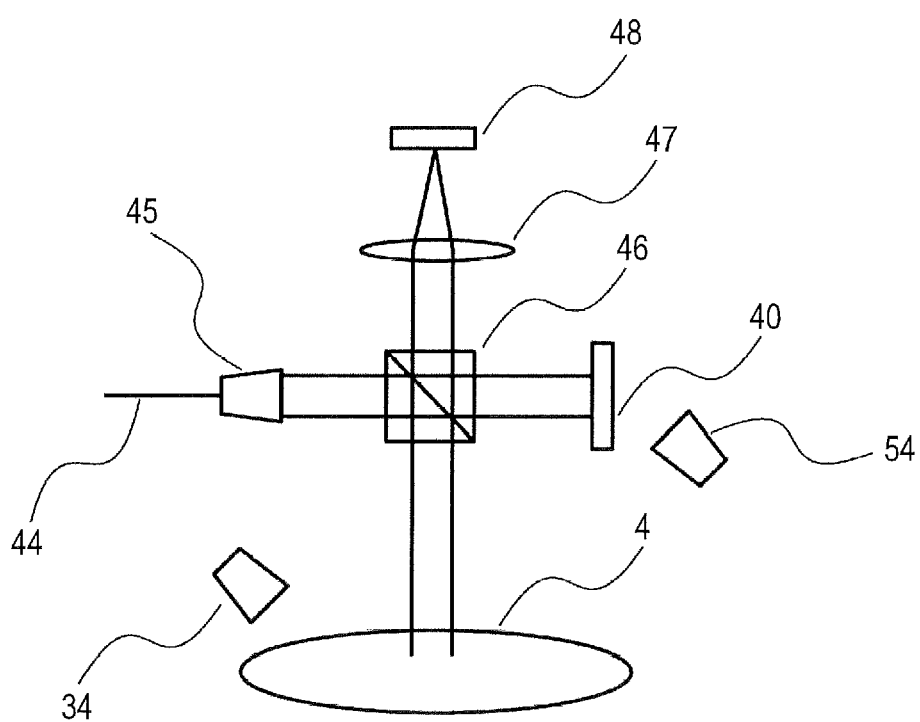
FIG. 4 is an explanatory diagram showing a detailed configuration of optical system that irradiates a sample wafer and a reference wafer with light.

The optical system from the optical fiber 44 to the photodetector 48 is provided with the collimator lens 45 and a condenser lens 47, as shown in FIG. 4.

The collimator lens 45 converts the light transmitted from the swept light source 42 via the optical fiber 44 into parallel light, and directs the light into the beam splitter 46.

The condenser lens 47 condenses light, which is reflected from the respective wafers 4, 40 and returns to the beam splitter 46 and then exits the beam splitter 46 towards the photodetector 48, onto a light receiver of the photodetector 48.

A second blower mechanism 54 that blows air to the front and back surfaces of the reference wafer 40 is arranged in the vicinity of the reference wafer 40, as in the sample wafer 4. The second blower mechanism 54 corresponds to one example of the temperature adjustment mechanism of the present disclosure, and comprises, for example, two blower fans to blow air onto the front and back surfaces of the reference wafer 40, as in the first blower mechanism 34.

Figure 5:
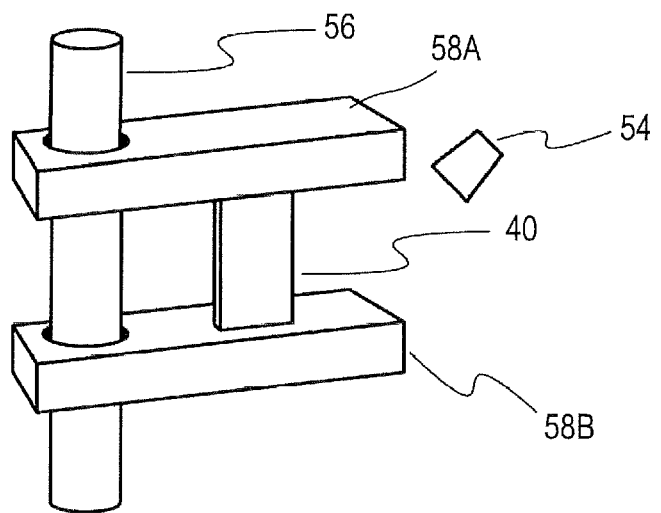
FIG. 5 is an explanatory diagram showing a configuration of a holder that holds the reference wafer in the probe.

The reference wafer 40 has, for example, a rectangular shape with one side of 5 to 30 mm, and is positioned and fixed within the probe 8 with two sides opposing to each other being held by two holding plates 58A, 58B, as shown in FIG. 5. This can reduce an area of contact between the reference wafer 40 and a member holding the reference wafer 40, so as to reduce fluctuations in temperature of the reference wafer 40 due to temperature of the holding member.

The two holding plates 58A, 58B each has a hole for attachment to a supporting shaft 56 provided inside the probe 8. When the supporting shaft 56 is inserted through the holes, the holding plates 58A, 58B are attached to the supporting shaft 56 so that plate surfaces thereof are opposed and parallel to each other.

The holding plates 58A, 58B are configured to be displaced in a center axis direction of the supporting shaft 56, so as to be able to adjust spacing therebetween when holding the reference wafer 40. The holding plates 58A, 58B are configured to rotate about a center axis of the supporting shaft 56, so as to be able to adjust a tilt of the plate surface of the reference wafer 40 relative to the beam splitter 46.

Therefore, it is possible to easily adjust the optical axis of the light that is incident on the reference wafer 40 from the beam splitter 46 and is reflected from the reference wafer 40 toward the beam splitter 46. In order to adjust the tilt of the plate surface of the reference wafer 40 relative to the beam splitter 46, the supporting shaft 56 may have a tilt adjustment function.

The holder 10 that holds the sample wafer 4 is formed in an annular shape having inner and outer diameters corresponding to the size (for example, 12 inches (300 mm)) of the sample wafer 4 so that the holder 10 can hold the sample wafer 4 with an edge portion of the outer circumference of the sample wafer 4 in contact with the holder 10.

It is desirable that the holder 10 is configured such that, when there is a change in ambient temperature, the sample wafer 4 is exposed to the atmosphere as much as possible so that the temperature of the sample wafer 4 changes in the same manner as the reference wafer 40.

Figure 6A:
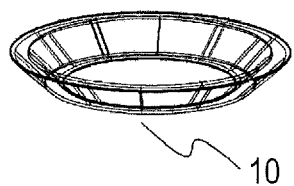
FIG. 6 is an explanatory diagram showing an example configuration of a holder of the sample wafer.
Figure 6A:
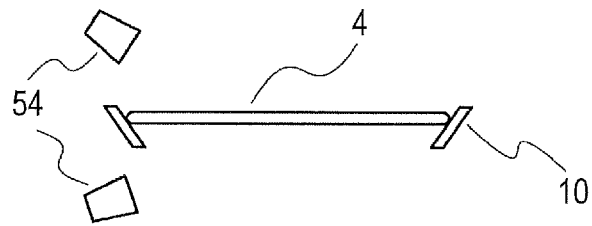

Thus, as shown in FIG. 6A, the holder 10 is formed in a dish shape with a tilted inner circumferential surface so as to contact the outer circumferential edge of the sample wafer 4 with a very small area of contact. This holder 10 can reduce influence on the temperature of the sample wafer 4 by the temperature of the holder 10, and allows the temperature change of the sample wafer 4 due to change in ambient temperature to follow the temperature change of the reference wafer 40.

Figure 6B:
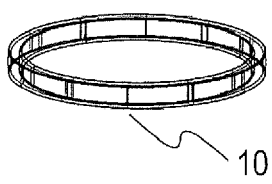
Figure 6B:
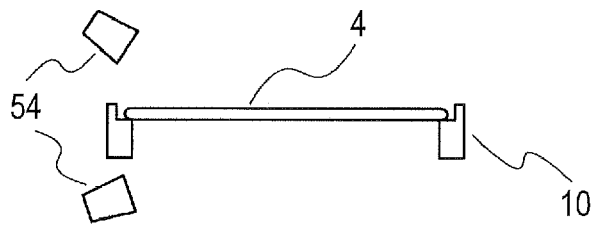
Figure 6C:
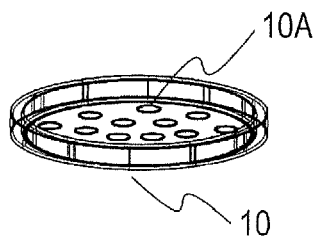
Figure 6C:
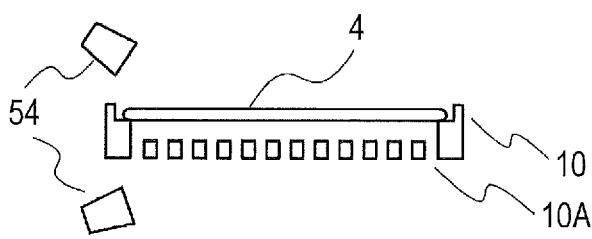

As shown in FIG. 6B or 6C, the holder 10 may be configured to have a step on the inner circumferential surface so that only the bottom surface of the outer circumferential edge of the sample wafer 4 contact the holder 10, and the sample wafer 4 is placed on the inner portion of the step.

In this case, a region to place the sample wafer 4 may be set to have a size in which an outer circumferential region of the sample wafer 4, excluded from the thickness distribution measurement, can be placed. For example, in the thickness distribution measurement of the sample wafer 4 of 12 inches (300 mm), a range of 1 mm from the outer circumference of the sample wafer 4 is the region excluded from the measurement. Accordingly, in this case, the region where the sample wafer 4 can be placed in the holder 10 may be set to the size corresponding to the region excluded from the measurement.

The holder 10 is formed in an annular shape so as not to contact the bottom surface of the sample wafer 4. In order to ensure the strength, the holder 10 may be provided with a bottom plate so that the bottom plate does not contact the bottom surface of the sample wafer 4, as shown in FIG. 6C. However, in this case, it is desirable that the bottom plate has multiple holes 10A to have good breathability.

Figure 6D:
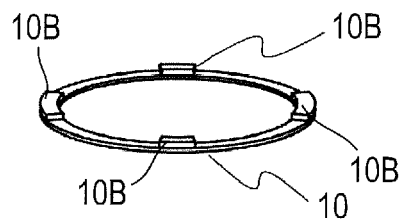
Figure 6D:
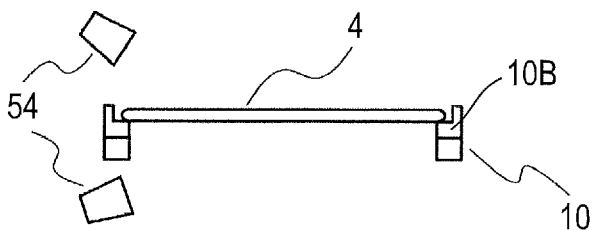

The holder 10 shown in FIGS. 6A to 6C contact the entire outer circumference of the sample wafer 4 to hold the sample wafer 4. As shown in FIG. 6D, however, the holder 10 may contact some parts of the outer circumference of the sample wafer 4 to hold the sample wafer 4.

The holder 10 shown in FIG. 6D is configured such that four stepped parts that contact with the sample wafer 4 are provided on the outer circumference of the sample wafer 4 in the holder 10 shown in FIG. 6B. However, it is only necessary that these stepped parts are arranged dispersedly relative to the outer circumference of the sample wafer 4 so that the sample wafer 4 can be placed thereon. The number of the steps may be appropriately determined.

Next, an explanation will be given on a measurement process (in other words, measurement method) when the thickness of the sample wafer 4 is measured in the processor/calculator 50, with reference to a flowchart shown in FIG. 7.

The processor/calculator 50 comprises a DAQ (data acquisition system) including an A/D converter and a FFT analyzer, and a FPGA (field programmable gate array) that uses the DAQ to calculate the thickness of the sample wafer 4. Thus, the measurement process described below can be implemented by the operation of the FPGA.

Figure 7:
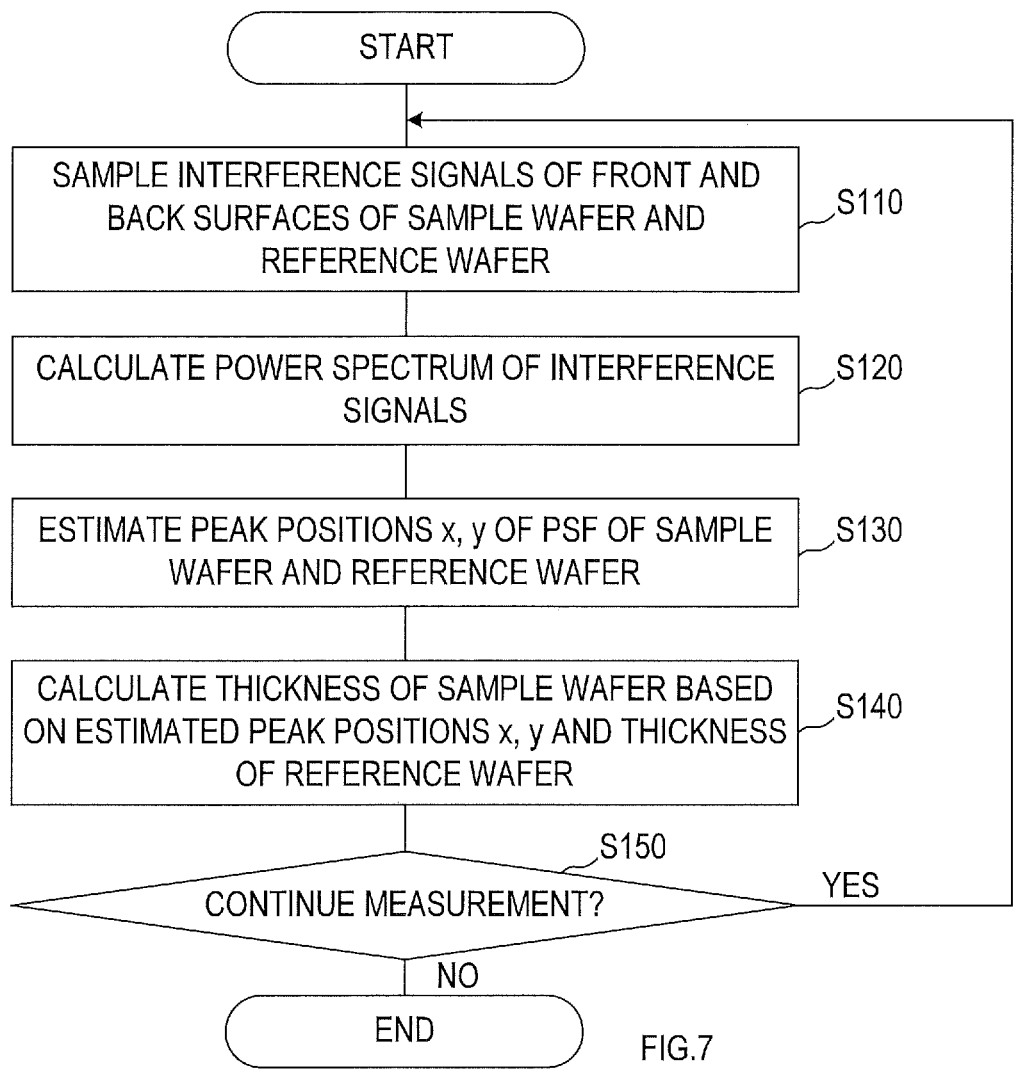
FIG. 7 is a flowchart showing procedures for measuring a thickness of the sample wafer by a processor/calculator.

As shown in FIG. 7, in the processor/calculator 50, first in S110, the swept light source 42 is driven to irradiate the sample wafer 4 and the reference wafer 40 with light, and interference signals from the respective wafers 4, 40 input from the photodetector 48 are sampled. As described above, the A-trigger signal input from the swept light source 42 and the k-trigger signal input from the Mach-Zehnder interferometer 44 are used for sampling of the interference signals.

Next, in S120, the interference signals sampled in S110 are multiplied by a window function to perform FET analysis by the FFT analyzer, so as to calculate the power spectrum of the PSF. In S130, from the power spectrum calculated in S120, the peak positions x, y corresponding to the thicknesses of the sample wafer 4 and the reference wafer 40 are estimated. The process moves to S140.

In S140, based on the peak positions x, y of the PSF corresponding to the thicknesses of the sample wafer 4 and the reference wafer 40 estimated in S130, and a thickness "treference" of the reference wafer 40, a thickness "tsample" of the sample wafer 4 is calculated using formula (3) below.

$$tsample(i) = \{x(i+\text{delay}) \cdot treference / y(i)\} - \{y(i) - y(0)\} \cdot A - \{y(i) - y(i+1)\} \cdot B \quad (3)$$

In the formula (3), "delay" represents a difference in time response to temperature change between the sample wafer 4 and the reference wafer 40. "A" represents a correction factor for correcting an error due to a difference in refractive index temperature coefficient between the sample wafer 4 and the reference wafer 40. "B" represents a correction factor for correcting an error due to the difference in time response between the sample wafer 4 and the reference wafer 40.

These parameters "delay", "A" and "B" are set in advance by experiments and the like. The subscript (i) represents a value of specified time, the subscript (0) indicates a value of reference time, and the subscript (i+1) indicates time next to the specified time.

When the thickness "tsample" of the sample wafer 4 is calculated in S140, the process moves to S150 to determine whether the measurement should be continued. This determination is performed based on a measurement command from the controller 60.

When it is determined in S150 that the measurement should be continued, the process moves to S110 to start the measurement at the next measurement point. When it is determined in S150 that the measurement should not be continued, the measurement operation ends.

In the present embodiment, the procedures of S110 to S130 correspond to one example of a signal processor of the present disclosure, and the procedure of S140 correspond to one example of a calculator of the present disclosure.

Next, an explanation will be given on the formula (3) used to calculate the thickness "tsample" of sample wafer 4 in S140.

The reason why the reference wafer 40 is used for measurement of the sample wafer 4 in the present embodiment is because, as shown in FIG. 3, if the peak positions x, y of the PSF of the respective wafers 4, 40 are estimated, the thickness "tsample" of sample wafer 4 can be calculated proportionally.

In other words, since the thickness "treference" of the reference wafer 40 is already measured, the thickness "tsample" of the sample wafer 4 can be calculated using formula (1) below.

$$tsample = x \cdot treference / y \quad (1)$$

Figure 8:
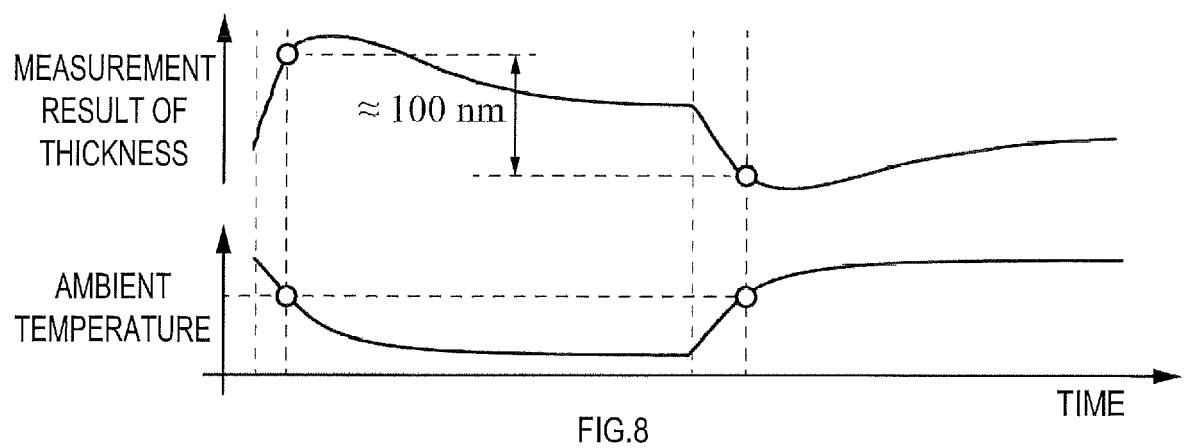
FIG. 8 is a time chart showing changes in measurement result due to change in ambient temperature.

When the thickness "tsample" of the sample wafer 4 is calculated using the formula (1), there is no problem as long as the ambient temperature does not change from the reference temperature for measurement. However, it was found that, as shown in FIG. 8, when there is a change in ambient temperature, the measurement result of the thickness "tsample" also changes.

Figure 9:
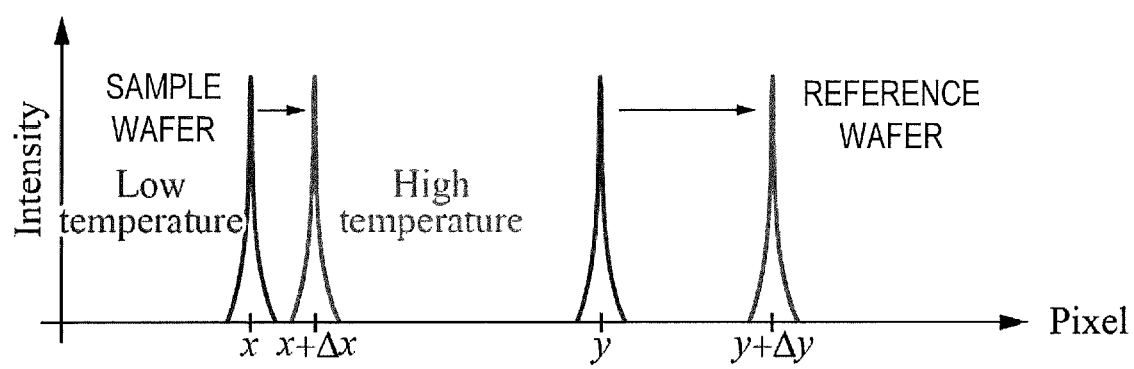
FIG. 9 is an explanatory diagram showing changes in peak positions of the PSF due to temperature change.

The reason for this is, as shown in FIG. 9, if the temperatures of the sample wafer 4 and the reference wafer 40 increase, the peak positions x, y of the PSF also change, and variations Δx, Δy (rate of change, in detail) thereof differ between the sample wafer 4 and the reference wafer 40.

In other words, in consideration of the variations Δx, Δy of the peak positions, the formula (1) can be written as formula (1-1) below.

$$tsample = (x + \Delta x) \cdot treference / (y + \Delta y) \quad (1-1)$$

However, in practice, temperature change ΔT is different between the sample wafer 4 and the reference wafer 40. Thus, the above-described formula cannot cancel the influence of ΔT.

Figure 10:
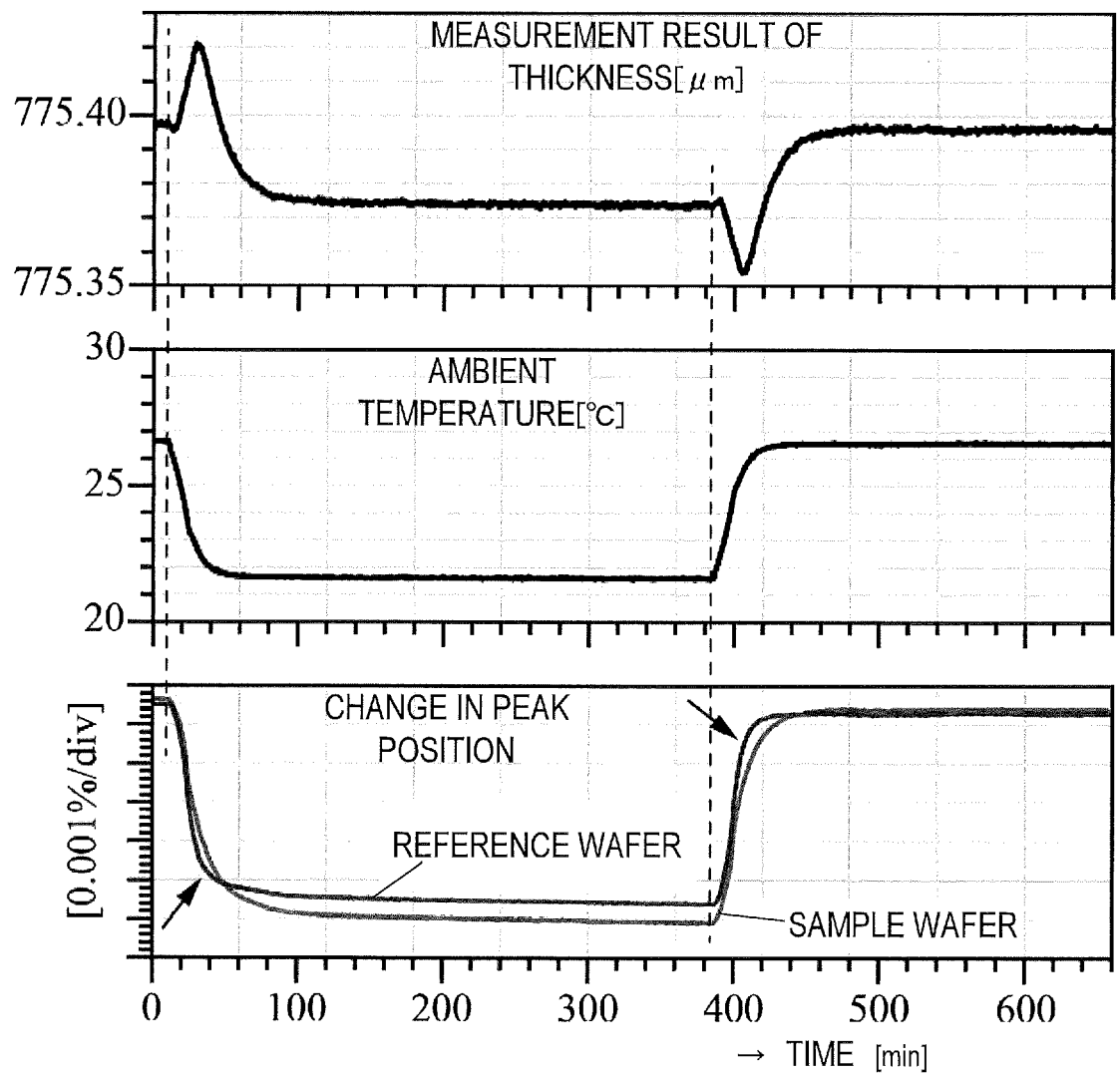
FIG. 10 is a time chart showing the changes in peak positions of the PSF and the measurement result due to the change in ambient temperature.

For example, FIG. 10 shows a measurement result obtained by putting the probe 8 and the sample wafer 4 in a constant temperature bath, changing the ambient temperature while observing the same section of the sample wafer 4, and calculating the thickness "tsample" of the sample wafer 4 using the above-described formula (1-1).

As can be seen from FIG. 10, as the temperature starts to decrease, the measurement result varies in inverse correlation with the temperature. As the temperature becomes stable, the measurement result also converges to a constant value slightly after the temperature change.

As to the peak positions of the PSF corresponding to the thicknesses of the respective wafers 4, 40, the reference wafer 40 responds faster immediately after the temperature change, and, after the temperature is stabilized, there is a larger shift in the sample wafer 4.

From the above, it can be seen that the time responses (time constants) at the peak positions x, y of the PSF to the change in ambient temperature and amounts of shift differ between the sample wafer 4 and the reference wafer 40. Thus, in the present embodiment, the blower mechanisms 34, 54 that blow air to the sample wafer 4 and the reference wafer 40 are provided so that the sample wafer 4 and the reference wafer 40 have the same temperature changes (time responses) relative to the change in ambient temperature using the hardware configuration.

Since the above-described problem cannot be sufficiently removed only by the blower mechanisms 34, 54, the thickness of the sample wafer 4 is calculated using the above-described formula (3), so as to bring the time responses of the sample wafer 4 and the reference wafer 40 close to each other by a function of software.

In other words, in the formula (3), in consideration of delay in measurement timing of the peak position x of the sample wafer 4 relative to the peak position y of the reference wafer 40, the peak position x(i) in the formula (1) is changed to a value x(i+delay) obtained by delaying the peak position x(i) by the delayed time "delay".

Also, in the formula (3), a correction term based on the difference {y(i)−y(0)} between the peak position y(i) calculated at the specified time, and the peak position y(0) calculated at the reference time, for example, initial value, is added as a second term of the formula (1). The second term is a correction term for correcting an error due to the difference in refractive index temperature coefficient between the sample wafer 4 and the reference wafer 40, and {y(i)−y(0)} is multiplied by the correction factor "A".

Also in the formula (3), a correction term based on the difference {y(i)−y(i+1)} between the peak position y(i) calculated at the specified time and the peak position y(i+1) calculated at the next measurement time is added as a third term of the formula (1). The third term is a correction term for correcting an error due to the difference in time response between the sample wafer 4 and the reference wafer 40, and {y(i)−y(i+1)} is multiplied by the correction factor "B".

The respective parameters "delay", "A" and "B" in the formula (3) are experimentally set in advance so that change in measurement result of the thickness of the sample wafer 4 is the smallest relative to the change in ambient temperature.

As a result, use of the probe 8 (in other words, measurement apparatus) of the present embodiment allows stable measurement of the thickness of the sample wafer 4 regardless of the change in ambient temperature, and can increase measurement accuracy of the measurement apparatus.

In the present embodiment, the thickness of the sample wafer 4 is calculated using the formula (3). However, the thickness of the sample wafer 4 may be calculated using formula (2) below, which is the formula (3) without the second term and the third term.

$$tsample(i) = x(i + \text{delay}) \cdot treference / y(i) \quad (2)$$

In other words, the thickness of the sample wafer 4 can be calculated, even in this way, in consideration of the delay in temperature change of the sample wafer 4 relative to the reference wafer 40 due to the change in ambient temperature. Accordingly, it is possible to increase measurement accuracy as compared to the case in which the thickness of the sample wafer 4 is calculated using the formula (1).

Even if the thickness of the sample wafer 4 is calculated using the formula (1), the thickness of the sample wafer 4 can be measured accurately as compared to the conventional measurement apparatus when the thickness of the sample wafer 4 is measured in an environment with small temperature change. In other words, the formulae (1) to (3) may be appropriately selected to be used depending on the measurement environment.

Next, an explanation will be given on the process for setting the respective parameters "delay", "A" and "B" in the formula (3) by way of a flowchart shown in FIG. 11.

These parameters "delay", "A" and "B" are set while the controller 60 drives the temperature control mechanism 32 to change the ambient temperature continuously. Also, the controller 60, in the same manner as in the ordinary measurement, drives the first blower mechanism 34 and the second blower mechanism 54 to blow air to the sample wafer 4 and the reference wafer 40.

Figure 11:
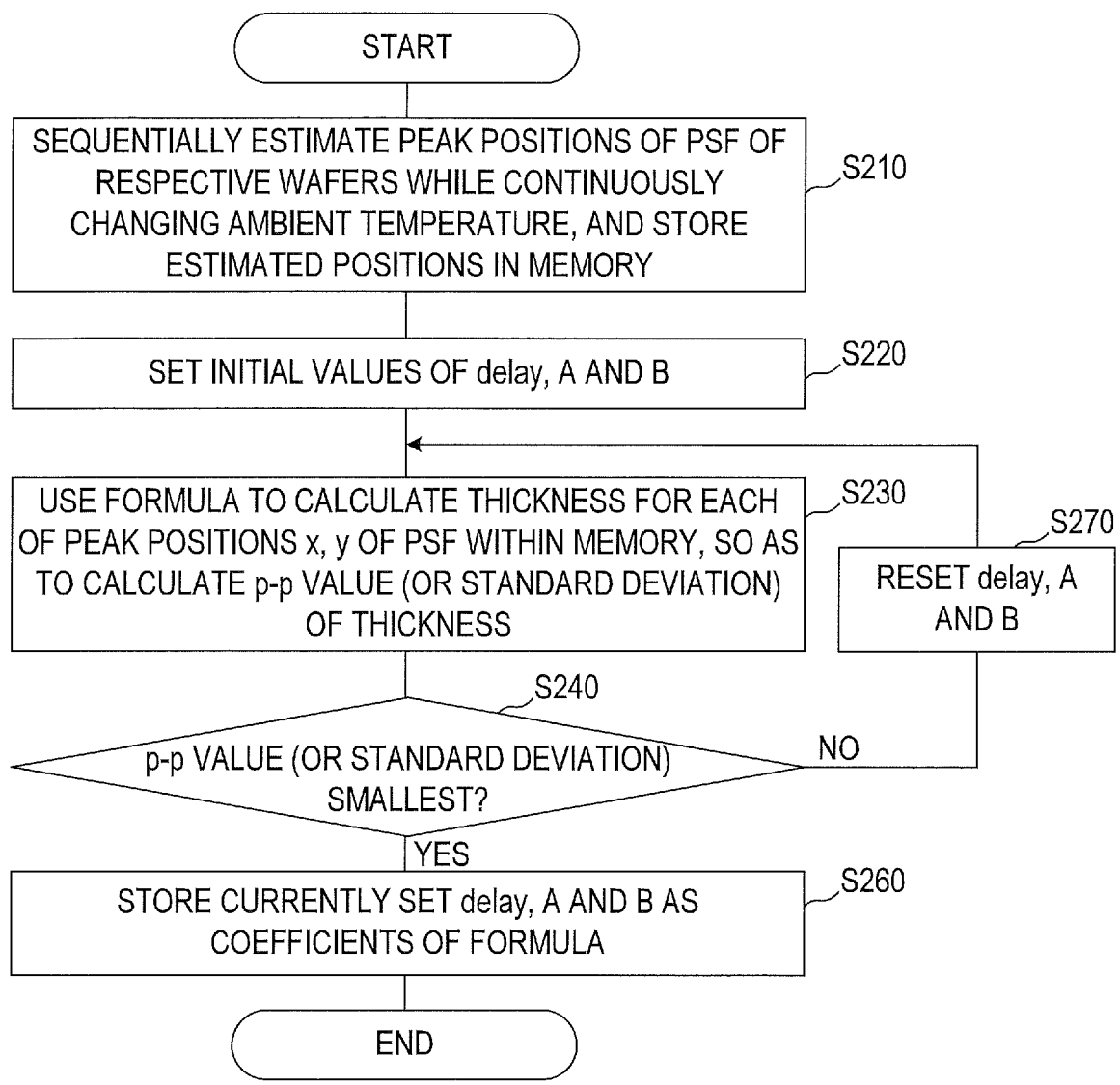
FIG. 11 is a flowchart showing procedures for setting coefficients of a formula used in calculating the thickness of the sample wafer.
Figure 12:
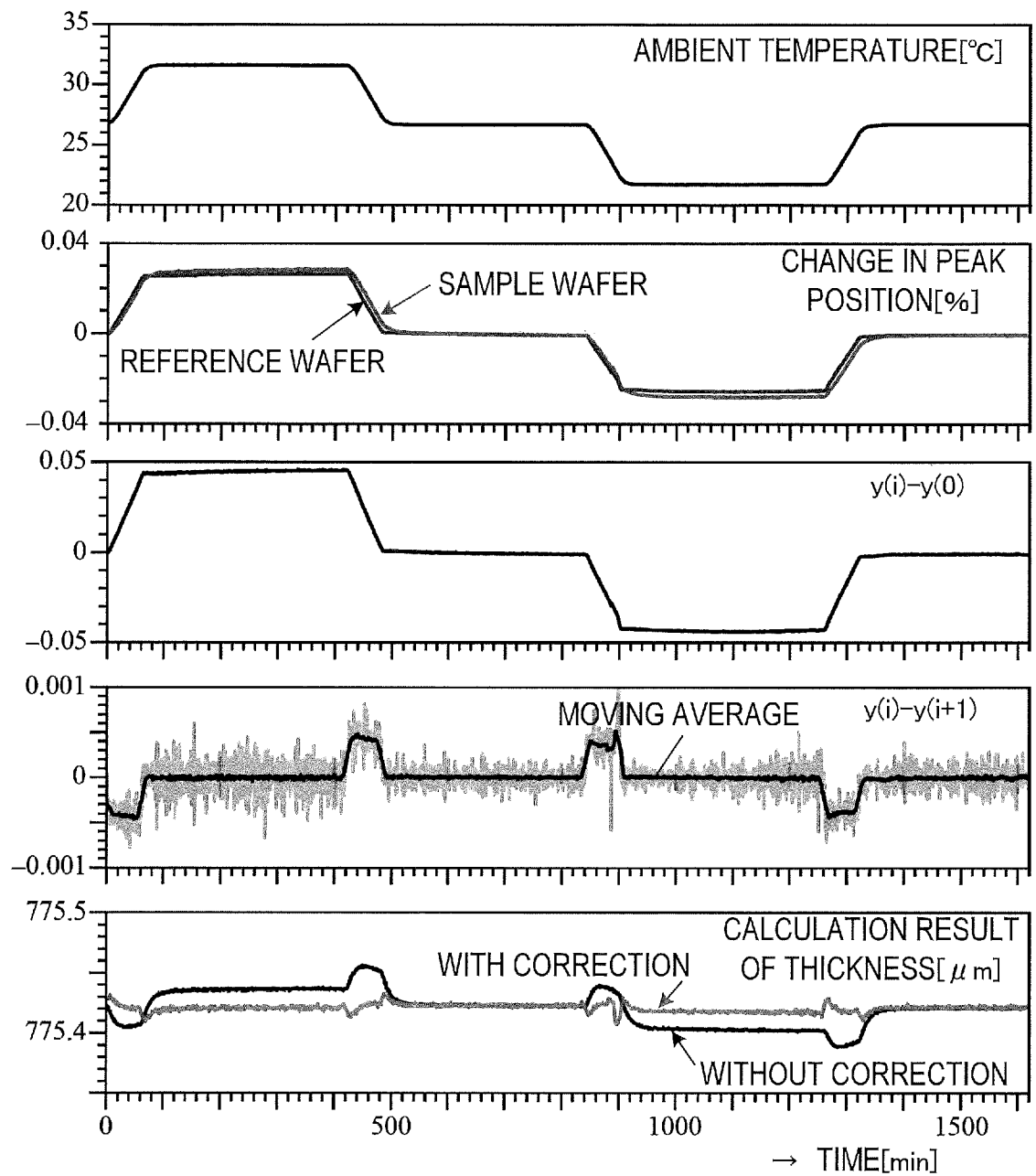
FIG. 12 is a time chart showing changes in correction parameters of the formula and calculation results due to the change in ambient temperature.

As shown in FIG. 11, the controller 60, first in S210, while continuously changing the ambient temperature as shown in FIG. 12, makes the probe 8 sequentially estimate the peak positions x, y of the PSF of the respective wafers 4, 40, and stores the estimation result in a memory of the controller 60. At this time, the measurement point of the sample wafer 4 by the probe 8 is fixed.

As a result, the peak positions x, y of the PSF of the respective wafers 4, 40 that change in accordance with the change in ambient temperature are sequentially stored in the memory. Since air is blown to the sample wafer 4 and the reference wafer 40, the peak positions x, y change to follow the change in ambient temperature, as shown in FIG. 12.

However, during a transitional period of the change in ambient temperature, the time response of the sample wafer 4 changes with a slight delay from the time response of the reference wafer 40 due to a difference in heat capacity, etc. In other words, the reference wafer 40 has a slightly smaller time constant than that of the sample wafer 4, and the refractive index temperature coefficients of the respective wafers 4, 40 are slightly different. Thus, amounts of shift are also slightly different.

When S210 is executed as above, the process moves to S220 to set initial values to the respective parameters "delay", "A" and "B" of the formula (3). The process moves to S230.

In S230, the thickness of the sample wafer 4 is calculated, using time-series data of the peak positions x, y of the respective wafers 4, 40 stored in the memory and the formula (3), for each of the measured peak positions x, y (in other words, at each measurement timing).

The difference {y(i)−y(0)} in peak position y of the second term of the formula (3) obtained during this measurement generally corresponds to the change in ambient temperature, as shown in FIG. 12. Also, the difference {y(i)−y(i+1)} in peak position y of the third term of the formula (3) largely fluctuates during the transitional period of the change in ambient temperature, as shown in FIG. 12.

In addition, in S230, when the thickness of the sample wafer 4 is calculated at all measurement timings, a difference between a minimum value and a maximum value of the calculated thickness, in other words, p-p value, is calculated. In place of the p-p value, a standard deviation may be calculated.

In S240, it is determined whether the p-p value (or standard deviation) calculated in S230 is equal to or smaller than a preset threshold, in other words, is the smallest.

When it is determined in S240 that the p-p value (or standard deviation) is not the smallest, the process moves to S270 to reset the parameters "delay", "A" and "B" so that the p-p value (or standard deviation) is the smallest. The process returns to S230.

As a result, while the parameters "delay", "A" and "B" of the formula (3) are changed, S230 is repeatedly executed until the p-p value (or standard deviation) is the smallest that is equal to or smaller the threshold.

In S240, when it is determined that the p-p value (or standard deviation) is the smallest, the process moves to S260 to store the respective parameters "delay", "A" and "B" currently set in the memory as the coefficients of the formula (3), and ends the process.

As a result, the respective parameters "delay", "A" and "B" of the formula (3) are set to values that allow more accurate calculation of the thickness of the sample wafer 4. Thereafter, the calculation can be performed with higher accuracy using the formula (3).

In FIG. 12, the chart shown in the lowest section shows a calculation result with corrections in which the thickness is calculated using the respective parameters "delay", "A" and "B" of the formula (3), and a calculation result without corrections in which the thickness is calculated using the formula (1).

As is clear from the chart, although the calculation result of the thickness without corrections changes in accordance with the change in ambient temperature, the calculation result of the thickness with corrections is approximately constant relative to the change in ambient temperature. According to the present embodiment, it is understood that measurement accuracy can be improved.

OTHER EMBODIMENTS

Although the embodiment to carry out the present disclosure has been described above, the present disclosure is not limited to the above-described embodiment, and can be practiced in various forms.

[First Variation]

The above-described embodiment explains a SS-OCT (Swept Source-OCT) measurement apparatus that uses the swept light source 42 as a light source for measurement and receives interference signals of the reflected light from the sample wafer 4 and the reference wafer 40 by the photodetector 48.

Figure 13:
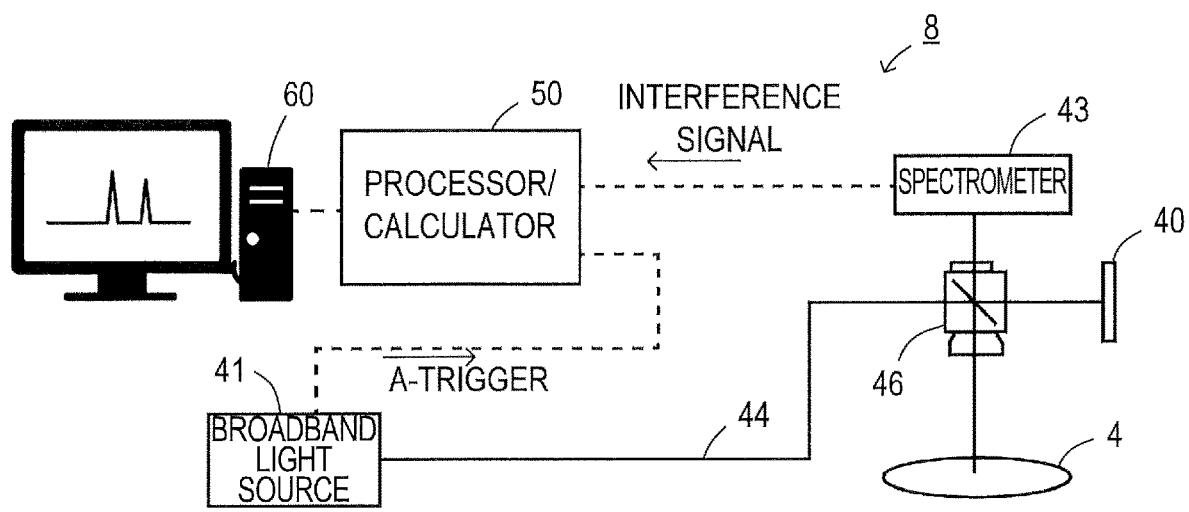
FIG. 13 is an explanatory diagram showing an internal configuration of the probe of a first variation.

However, the thickness measuring method and apparatus of the present disclosure may comprise a broadband light source 41 as a light source as shown in FIG. 13, and may be configured to separate the interference signals of the reflected light from the sample wafer 4 and the reference wafer 40 by a spectrometer 43 to receive light with each wavelength. In other words, the thickness measurement method and apparatus of the present disclosure can have the same effect as in the above-described embodiment, even if applied to a SD-OCT (Spectral Domain-OCT) measurement apparatus shown in FIG. 13.

[Second Variation]

Figure 14:
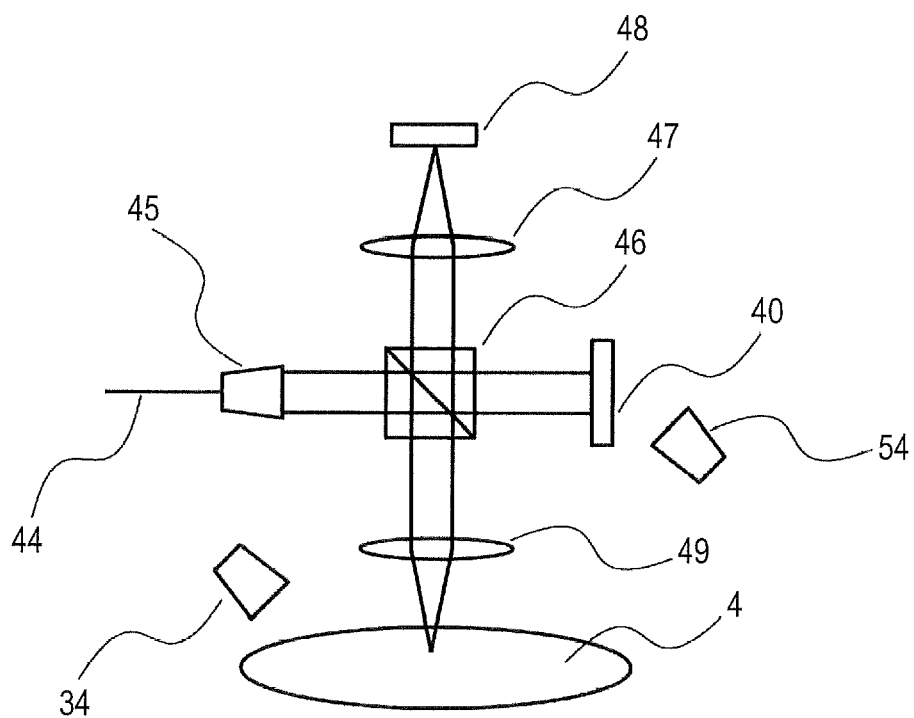
FIG. 14 is an explanatory diagram showing a detailed configuration of the optical system of a second variation.

In the above-described embodiment, the sample wafer 4 is directly irradiated with the light split by the beam splitter 46. However, as shown in FIG. 14, a condenser lens 49 may be provided in a light path from the beam splitter 46 to the sample wafer 4.

This can condense the light beam emitted on the sample wafer 4 so as to increase spatial resolution. For example, if a lens with a focal length f=40 mm is used, the light beam emitted on the front surface of the sample wafer 4 can have a spot diameter of approximately 60 m at full width at half maximum to perform the measurement.

[Third Variation]

In the above-described embodiment, the temperature control mechanism 32, the first blower mechanism 34, and the second blower mechanism 54 are provided so that the sample wafer 4 and the reference wafer 40 have the same temperature changes.

Figure 15:
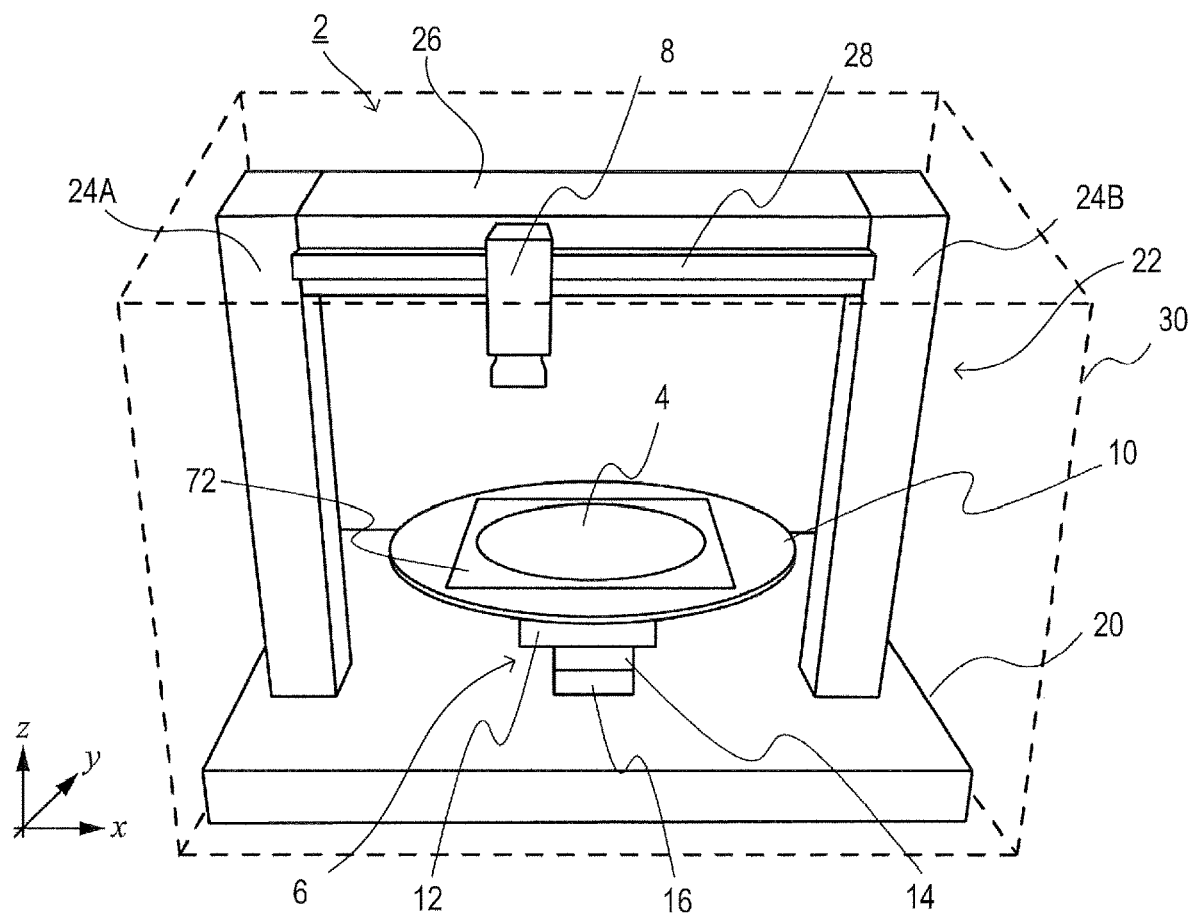
FIG. 15 is an explanatory diagram showing an overall configuration of the thickness distribution measurement apparatus of a third variation.
Figure 16:
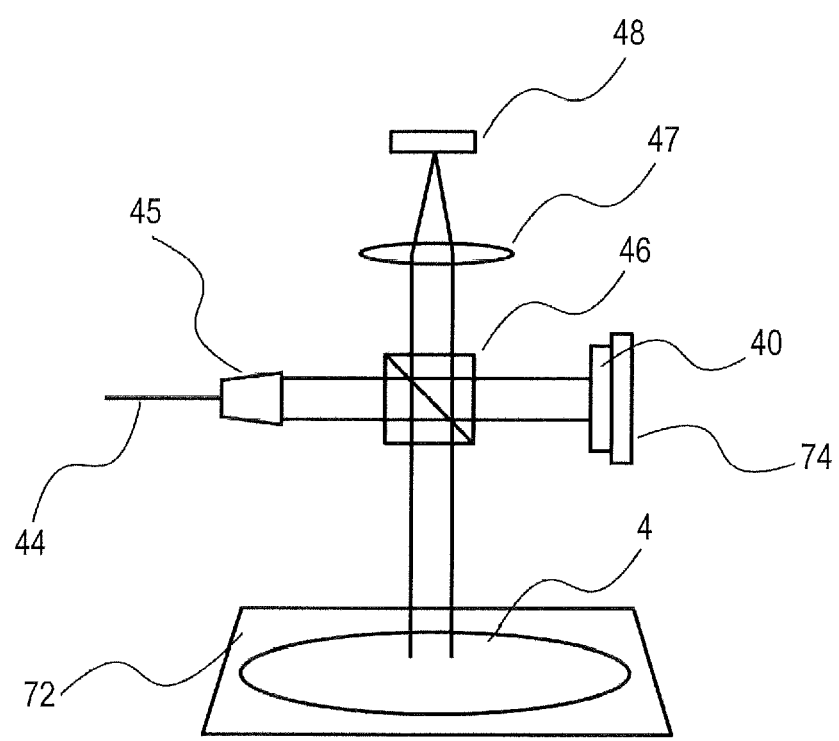
FIG. 16 is an explanatory diagram showing a detailed configuration of the optical system of the third variation.

In order to for the sample wafer 4 and the reference wafer 40 to have the same temperature changes, at least one of the temperatures of the sample wafer 4 and the reference wafer 40 may be directly controlled. For this purpose, as illustrated in FIGS. 15 and 16, the sample wafer 4 and the reference wafer 40 may be respectively provided with temperature control elements 72, 74, as the temperature adjustment mechanism.

The temperature control elements 72, 74 can be any elements that can control temperature by electric conduction or the like. For example, a TEC (Thermoelectric Controller) including a thermoelectric element such as a Peltier element, a ceramic heater, etc. can be used. As shown in FIGS. 15 and 16, the temperature control elements 72, 74 having a sheet-like shape are arranged on opposite sides of the surfaces irradiated with light for measurement (that is, sides of the back surfaces) of the sample wafer 4 and the reference wafer 40.

A constant control current, which is preset to bring the sample wafer 4 and the reference wafer 40 to the same temperature, is applied to the temperature control elements 72, 74. This allows the sample wafer 4 and the reference wafer 40 to have the same temperature without using the above-described temperature control mechanism 32, the first blower mechanism 34 and the second blower mechanism 54.

The temperature control elements 72, 74 may be used in combination with the temperature control mechanism 32, the first blower mechanism 34 and the second blower mechanism 54. This can more stabilize the temperatures of the sample wafer 4 and the reference wafer 40.

[Other Variations]

It is not necessary to have all of the temperature control elements 72, 74, the temperature control mechanism 32, the first blower mechanism 34 and the second blower mechanism 54, as a temperature control function. In other words, measurement accuracy can be improved only by using any of the above-described formulae (1) to (3) to calculate the thickness of the sample wafer 4, as compared to conventional apparatus. In this case, measurement accuracy can be all the more improved by further including at least one of the temperature control mechanism 32, the first blower mechanism 34, the second blower mechanism 54, and temperature control elements 72, 74.

Functions of one component in the above-described embodiments may be achieved by two or more components, and a function of one component may be achieved by two or more components. Moreover, functions of two or more components may be achieved by one component, and a function achieved by two or more components may be achieved by one component. Furthermore, part of the configurations of the above-described embodiments may be omitted. At least part of the configurations of the above-described embodiments may be added to or replaced with other configurations of the above-described embodiments.

In the above-described embodiment, the processor/calculator 50 comprises the DAQ and the FPGA. The FPGA executes various calculations in the procedures shown in FIG. 7, so as to calculate the thickness of the sample wafer 4. However, the processor/calculator 50 may comprise a computer.

In this case, the computer may be a microcomputer for measurement or a computer that configures the controller 60. In case that the processor/calculator 50 is configured by a computer as such, it is necessary to have a program that causes the computer to execute the procedures shown in FIG. 7. The present disclosure can be implemented in various modes, for example, with this program, or a non-transitory tangible recording medium, such as a semiconductor memory, that stores this program.

What is claimed is:

1. A measurement apparatus for measuring a thickness of a semiconductor wafer comprising:

an optical system configured to perpendicularly irradiate each of a sample wafer, which is a semiconductor wafer to be measured, and a reference wafer, which is a semiconductor wafer having a uniform thickness, with light to receive interference signals of the light reflected on front and back surfaces of the sample wafer and the reference wafer;

a signal processor configured to perform frequency analysis of the interference signals received by the optical system to obtain peak positions of point spread functions of the sample wafer and the reference wafer;

a calculator configured to calculate a thickness "tsample" of the sample wafer based on the peak position "x" of the sample wafer and the peak position "y" of the reference wafer obtained by the signal processor, and the thickness "treference" of the reference wafer; and a temperature adjustment mechanism configured to adjust at least one of temperatures of the sample wafer and the reference wafer.

2. The measurement apparatus according to claim 1, wherein the calculator is configured to calculate the thickness of the sample wafer, using formula (1) below:

$$tsample = x \cdot treference / y. \quad (1)$$

3. The measurement apparatus according to claim 2, wherein the calculator is configured to calculate the thickness of the sample wafer, in consideration of a difference "delay" in time response to temperature change between the sample wafer and the reference wafer, using formula (2) below:

$$tsample(i) = x(i + \text{delay}) \cdot treference / y(i) \quad (2)$$

where subscript (i) represents specified time.

4. The measurement apparatus according to claim 1, wherein the calculator is configured to calculate the thickness of the sample wafer, using formula (3) below with a difference "delay" in time response to temperature change between the sample wafer and the reference wafer, a correction factor "A" for correcting a difference in refractive index temperature coefficient between the sample wafer and the reference wafer, and a correction factor "B" for correcting the difference in time response between the sample wafer and the reference wafer as parameters:

$$tsample(i) = \quad (3)$$
$$\{x(i + \text{delay}) \cdot treference / y(i)\} - \{y(i) - y(0)\} \cdot A - \{y(i) - y(i+1)\} \cdot B$$

where subscript (i) represents a value of specified time, subscript (0) represents value of a reference time, and subscript (i+1) is a value of time next to the specified time.

5. The measurement apparatus according to claim 1, wherein the optical system comprises a beam splitter arranged in a free space that serves as an irradiation path of the light to the sample wafer, and configured to split the light in two directions within the free space, and the optical system is configured to irradiate the sample wafer with first light, and the reference wafer with second light, the first light and the second light being obtained by splitting the light by the beam splitter.

6. The measurement apparatus according to claim 1, wherein the reference wafer has a same composition as the sample wafer.

7. The measurement apparatus according to claim 1, wherein the temperature adjustment mechanism comprises a blower mechanism configured to blow ambient air onto at least one of the sample wafer and the reference wafer.

8. The measurement apparatus according to claim 1, wherein the temperature adjustment mechanism comprises a temperature control element provided on at least one of the sample wafer and the reference wafer, and configured to directly control the temperature of the sample wafer or the reference wafer.

9. The measurement apparatus according to claim 1, wherein a measurement space where the sample wafer and the reference wafer are arranged is enclosed by a housing.

10. The measurement apparatus according to claim 1, comprising:

a temperature control mechanism configured to control temperature of a measurement space where the sample wafer and the reference wafer are arranged.

11. The measurement apparatus according to claim 1, wherein the optical system comprises a swept light source configured to continuously and periodically change a wavelength of the light as a light source to generate the light emitted on the sample wafer and the reference wafer, and a photodetector configured to detect the interference signals of the light reflected on the front and back surfaces of the sample wafer and the reference wafer, the signal processor is configured to sample a detection signal from the photodetector multiple times per period, in synchronization with periodical changes in wavelength of the light output from the swept light source, to perform frequency analysis of the detection signal.

12. The measurement apparatus according to claim 11, comprising:

a Mach-Zehnder interferometer configured to take in a portion of the light output from the swept light source to generate a sampling clock signal, wherein the signal processor is configured to sample the detection signal from the photodetector based on the sampling clock signal generated by the Mach-Zehnder interferometer.

13. The measurement apparatus according to claim 1, wherein the optical system comprises a broadband light source as a light source to generate the light emitted on each of the sample wafer and the reference wafer, and a spectrometer configured to separate the interference signals reflected on the front and back surfaces of the sample wafer and the reference wafer per wavelength, and the signal processor is configured to perform frequency analysis of signals obtained by separation per wavelength by the spectrometer.

* * * * *